(12) United States Patent
Kageura et al.

(10) Patent No.: US 11,024,847 B2
(45) Date of Patent: Jun. 1, 2021

(54) POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

(71) Applicants: SUMITOMO CHEMICAL COMPANY, LIMITED, Tokyo (JP); TANAKA CHEMICAL CORPORATION, Fukui (JP)

(72) Inventors: Jun-ichi Kageura, Tsukuba (JP); Hiroyuki Kurita, Tsukuba (JP); Yuichiro Imanari, Fukui (JP)

(73) Assignees: SUMITOMO CHEMICAL COMPANY, LIMITED, Tokyo (JP); TANAKA CHEMICAL CORPORATION, Fukui (JP)

( * ) Notice: Subject to any disclaimer, the term of this patent is extended or adjusted under 35 U.S.C. 154(b) by 2 days.

(21) Appl. No.: 15/538,401

(22) PCT Filed: Dec. 22, 2015

(86) PCT No.: PCT/JP2015/085797
§ 371 (c)(1),
(2) Date: Jun. 21, 2017

(87) PCT Pub. No.: WO2016/104488
PCT Pub. Date: Jun. 30, 2016

(65) Prior Publication Data
US 2017/0358798 A1    Dec. 14, 2017

(30) Foreign Application Priority Data
Dec. 25, 2014    (JP) .............................. JP2014-263116

(51) Int. Cl.
| | | |
|---|---|---|
| H01M 4/505 | (2010.01) | |
| H01M 4/525 | (2010.01) | |
| H01M 10/0525 | (2010.01) | |

(52) U.S. Cl.
CPC .......... *H01M 4/505* (2013.01); *H01M 4/525* (2013.01); *H01M 10/0525* (2013.01)

(58) Field of Classification Search
CPC ... H01M 4/505; H01M 10/0525; H01M 4/525
(Continued)

(56) References Cited

U.S. PATENT DOCUMENTS

2009/0212267 A1* 8/2009 Dobbs ................. H01M 4/5825
                                                252/521.2
2010/0173197 A1* 7/2010 Li ...................... C01G 45/1228
                                                429/220
(Continued)

FOREIGN PATENT DOCUMENTS

| CN | 103367730 A | 10/2013 |
|---|---|---|
| EP | 2 816 641 A1 | 12/2014 |

(Continued)

OTHER PUBLICATIONS

Extended European Search Report dated Apr. 23, 2018 in corresponding application No. 15873056.4.
(Continued)

*Primary Examiner* — Cynthia H Kelly
*Assistant Examiner* — Omar M Kekia
(74) *Attorney, Agent, or Firm* — Foley & Lardner LLP (57) ABSTRACT

A positive electrode active material for a lithium secondary battery, including secondary particles formed by aggregation of primary particles capable of being doped and undoped with lithium ions, said positive electrode active material having: an α-NaFeO$_2$ type crystal structure represented by formula: Li[Li$_x$(Ni$_a$Co$_b$Mn$_c$M$_d$)$_{1-x}$]O$_2$ (I), wherein 0≤x≤0.1,
(Continued)

$0.7<a<1$, $0<b<0.2$, $0\leq c<0.2$, $0<d<0.1$, $a+b+c+d=1$, and M is at least one metal element selected from the group consisting of Fe, Cr, Ti, Mg, Al, Zr, Ca, Sc, V, Cr, Cu, Zn, Ga, Ge, Sr, Y, Zr, Nb, Mo, Tc, Ru, Rh, Pd, Ag, Cd, In and Sn; and a crystallite size α/crystallite size β ratio (α/β) of 1.60 to 2.40, wherein the crystallite size α is within a peak region of $2\theta=18.7\pm1°$ and the crystallite size β is within a peak region of $2\theta=44.4\pm1°$, each determined by a powder X-ray diffraction measurement using Cu-Kα radiation.

7 Claims, 2 Drawing Sheets

(58) Field of Classification Search
USPC .......................................................... 429/224
See application file for complete search history.

(56) References Cited

U.S. PATENT DOCUMENTS

| | | | | |
|---|---|---|---|---|
| 2011/0291042 | A1* | 12/2011 | Li | C01G 45/1228 252/182.1 |
| 2013/0108921 | A1 | 5/2013 | Kase et al. | |
| 2013/0260248 | A1* | 10/2013 | Seki | H01M 4/505 429/221 |
| 2015/0249248 | A1 | 9/2015 | Ishizaki et al. | |
| 2015/0280211 | A1 | 10/2015 | Kikuya et al. | |
| 2016/0006031 | A1 | 1/2016 | Kaseda et al. | |

FOREIGN PATENT DOCUMENTS

| | | |
|---|---|---|
| JP | H10-308218 A | 11/1998 |
| JP | 2004-335278 A | 11/2004 |
| JP | 2012-252964 A | 12/2012 |
| JP | 2013-120678 A | 6/2013 |
| JP | 2013-143358 A | 7/2013 |
| JP | 2013-206552 A | 10/2013 |
| WO | WO-2011/007751 A1 | 1/2011 |
| WO | WO 2011-122448 A1 | 10/2011 |
| WO | WO 2014-061653 A1 | 4/2014 |
| WO | WO 2014-061654 A1 | 4/2014 |
| WO | WO 2014-133064 A1 | 9/2014 |

OTHER PUBLICATIONS

International Search Report dated Feb. 9, 2016 in PCT/JP2015/085797.

Chinese Office Action dated Aug. 12, 2019 for corresponding Application No. 201580069817.7 (12 pages).

* cited by examiner

FIG. 2B

POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

CROSS-REFERENCE TO RELATED APPLICATIONS

The present application is a U.S. national stage application of International Patent Application No. PCT/JP2015/085797, filed Dec. 22, 2015, which claims the benefit of priority to Japanese Patent Application No. 2014-263116, filed Dec. 25, 2014, the entireties of which are hereby incorporated by reference.

TECHNICAL FIELD

The present invention relates to a positive electrode active material for a lithium secondary battery, a positive electrode for a lithium secondary battery and a lithium secondary battery.

BACKGROUND ART

Lithium-containing composite metal oxides are used as positive electrode active materials for lithium secondary batteries. Lithium secondary batteries have already been put to practical use not only as compact power supplies for portable telephones, notebook computers and the like, but also as medium- and large-sized power supplies for automobile use, electric power storage use, etc.

As a conventional positive electrode active material for a lithium secondary battery, Patent Document 1 discloses a positive electrode active material for a lithium secondary battery of a non-aqueous electrolytic liquid type, which is a lithium-transition metal composite oxide represented by $Li_{1.00}Ni_{0.33}Co_{0.34}Mn_{0.33}O_2$, with a BET specific surface area of 0.7 m$^2$/g and a crystallite size of 800 Å in a direction perpendicular to the 104 plane determined based on an X-ray diffraction pattern obtained by X-ray diffractometry. Further, Patent Document 2 discloses a positive electrode active material for a lithium secondary battery of a non-aqueous electrolytic liquid type, which is a lithium-transition metal composite oxide represented by $Li_{1.15}(Ni_{0.34}Co_{0.33}Mn_{0.33})_{0.9682}Mg_{0.001}Ca_{0.03}Na_{0.0008}O_2$, with a crystallite size of 1,580 Å in a direction perpendicular to the 003 plane determined based on an X-ray diffraction pattern obtained by X-ray diffractometry.

Furthermore, Patent Document 3 discloses a positive electrode active material for a lithium ion secondary battery, which is represented by the general formula $LiMO_2$ (M is Co, Ni or the like), and the crystallites of fine particles constituting the positive electrode active material are stereoscopically almost isotropic in shape.

PRIOR ART REFERENCES

Patent Document

Patent Document 1: Japanese Unexamined Patent Application Publication No. 2004-335278
Patent Document 2: Japanese Unexamined Patent Application Publication No. 2012-252964
Patent Document 3: Japanese Unexamined Patent Application Publication No. Hei 10-308218

DISCLOSURE OF INVENTION

Problems to be Solved by the Invention

However, there is still a room for improvement in battery performance, such as discharge capacity, of a lithium secondary battery using the aforementioned conventional lithium-containing composite metal oxide as a positive electrode active material.

The present invention has been made in view of the above situation, and the object of the present invention is to provide a positive electrode active material which enables a lithium secondary battery to exhibit higher discharge capacity than conventional lithium secondary batteries. Further, the other objects of the present invention are to provide a positive electrode for a lithium secondary battery using such a positive electrode active material, and to provide a lithium secondary battery using such a positive electrode active material.

Means to Solve the Problems

For solving the aforementioned problems, the present invention in its first aspect provides a positive electrode active material for a lithium secondary battery, comprising secondary particles formed by aggregation of primary particles capable of being doped and undoped with lithium ions, said positive electrode active material having:

an $\alpha$-NaFeO$_2$ type crystal structure represented by formula (I) below:

$$Li[Li_x(Ni_aCo_bMn_cM_d)_{1-x}]O_2 \qquad (I)$$

wherein $0 \leq x \leq 0.1$, $0.7 < a < 1$, $0 < b < 0.2$, $0 \leq c < 0.2$, $0 < d < 0.1$, $a+b+c+d=1$, and M is at least one metal element selected from the group consisting of Fe, Cr, Ti, Mg, Al, Zr, Ca, Sc, V, Cr, Cu, Zn, Ga, Ge, Sr, Y, Zr, Nb, Mo, Tc, Ru, Rh, Pd, Ag, Cd, In and Sn; and a crystallite size $\alpha$/crystallite size $\beta$ ratio ($\alpha/\beta$) of 1.60 or more to 2.40 or less, wherein the crystallite size $\alpha$ is within a peak region of $2\theta=18.7\pm1°$ and the crystallite size $\beta$ is within a peak region of $2\theta=44.4\pm1°$, each determined by a powder X-ray diffraction measurement using Cu-K$\alpha$ ray.

In one embodiment of the present invention, it is preferable that a product of a 10% cumulative diameter ($D_{10}$) and a tapped density of the positive electrode active material is 17 g·μm/mL or more to 25 g·μm/mL or less, wherein the 10% cumulative diameter ($D_{10}$) is obtained from the results of the particle size distribution measurement.

In one embodiment of the present invention, it is preferable that the crystallite size $\alpha$ within a peak region of $2\theta=18.7\pm1°$ in a powder X-ray diffraction measurement using CuK$\alpha$ radiation is 400 Å or more to 1,200 Å or less.

In one embodiment of the present invention, the BET specific surface area of the positive electrode active material is 0.1 m$^2$/g or more to 1.0 m$^2$/g or less.

In one embodiment of the present invention, it is preferable that an atomic ratio (c/b) of Mn to Co in the formula (I) is $0 < c/b < 1.3$.

In one embodiment of the present invention, M is preferably Al.

The present invention in another aspect thereof provides a positive electrode for a lithium secondary battery, including the aforementioned positive electrode active material.

The present invention in still another aspect thereof provides a lithium secondary battery, including a negative electrode and the aforementioned positive electrode.

Effect of the Invention

The object of the present invention is to provide a positive electrode active material which enables a lithium secondary battery to exhibit higher discharge capacity than conventional lithium secondary batteries. Further, the present invention can also provide a positive electrode for a lithium secondary battery using such a positive electrode active material, and provide a lithium secondary battery using such a positive electrode active material.

DESCRIPTION OF THE EMBODIMENTS

[Positive Electrode Active Material for Lithium Secondary Battery]

The positive electrode active material for a lithium secondary battery according to the present embodiment includes secondary particles formed by aggregation of primary particles capable of being doped and undoped with lithium ions, said positive electrode active material having:

an α-NaFeO$_2$ type crystal structure represented by formula (I) below:

$$Li[Li_x(Ni_aCo_bMn_cM_d)_{1-x}]O_2 \quad (I)$$

wherein 0≤x≤0.1, 0.7<a<1, 0<b<0.2, 0≤c<0.2, 0<d<0.1, a+b+c+d=1, and M is at least one metal element selected from the group consisting of Fe, Cr, Ti, Mg, Al, Zr, Ca, Sc, V, Cr, Cu, Zn, Ga, Ge, Sr, Y, Zr, Nb, Mo, Tc, Ru, Rh, Pd, Ag, Cd, In and Sn; and a crystallite size α/crystallite size β ratio (α/β) of 1.60 or more to 2.40 or less, wherein the crystallite size α is within a peak region of 2θ=18.7±1° and the crystallite size β is within a peak region of 2θ=44.4±1°, each determined by a powder X-ray diffraction measurement using Cu-Kα radiation.

Hereinbelow, detailed explanations will be made on the positive electrode active material for a lithium secondary battery according to the present embodiment.

The positive electrode active material for a lithium secondary battery according to the present embodiment has an α-NaFeO$_2$ type crystal structure represented by formula (I) below:

$$Li[Li_x(Ni_aCo_bMn_cM_d)_{1-x}]O_2 \quad (I)$$

wherein 0≤x≤0.1, 0.7<a<1, 0<b<0.2, 0≤c<0.2, 0<d<0.1, a+b+c+d=1, and M is at least one metal element selected from the group consisting of Fe, Cr, Ti, Mg, Al, Zr, Ca, Sc, V, Cr, Cu, Zn, Ga, Ge, Sr, Y, Zr, Nb, Mo, Tc, Ru, Rh, Pd, Ag, Cd, In and Sn.

For obtaining a positive electrode active material with higher stability in air, x in the formula (I) is preferably 0.08 or less, more preferably 0.05 or less, and still more preferably 0.03 or less.

In the positive electrode active material for a lithium secondary battery according to the present embodiment, for obtaining a lithium secondary battery with higher capacity, a in the formula (I) is preferably 0.8 or more, more preferably 0.85 or more, and still more preferably 0.87 or more. For obtaining a lithium secondary battery with higher cycle performance, a in the formula (I) is preferably 0.96 or less, more preferably 0.94 or less, and still more preferably 0.92 or less.

The upper limit values and lower limit values of a can be arbitrarily combined.

In the present specification, the expression "high cycle performance" means that a discharge capacity retention after repeating a cycle of charge and discharge is high.

For obtaining a lithium secondary battery with less resistance, b in the formula (I) is preferably 0.02 or more, more preferably 0.03 or more, and still more preferably 0.04 or more. For obtaining a lithium secondary battery with higher thermal stability, b in the formula (I) is preferably 0.16 or less, more preferably 0.12 or less, and still more preferably 0.10 or less.

The upper limit values and lower limit values of b can be arbitrarily combined.

For obtaining a lithium secondary battery with higher cycle performance, c in the formula (I) is preferably 0.01 or more, and more preferably 0.02 or more. For obtaining a lithium secondary battery with higher storage stability under high temperature conditions (e.g., at 60° C.), c in the formula (I) is preferably 0.15 or less, more preferably 0.10 or less, and still more preferably 0.08 or less.

The upper limit values and lower limit values of c can be arbitrarily combined.

For obtaining a lithium secondary battery with higher thermal stability, the atomic ratio (c/b) of Mn to Co in the formula (I) is preferably 0<c/b<1.3, more preferably 1.0 or less, and especially preferably 0.5 or less. Further, the atomic ratio (c/b) of Mn to Co is preferably 0.1 or more, more preferably 0.15 or more, and especially preferably 0.2 or more.

The upper limit values and lower limit values of the ratio c/b can be arbitrarily combined.

M in the formula (I) is at least one metal selected from the group consisting of Fe, Cr, Ti, Mg, Al, Zr, Ca, Sc, V, Cr, Cu, Zn, Ga, Ge, Sr, Y, Zr, Nb, Mo, Tc, Ru, Rh, Pd, Ag, Cd, In and Sn.

For obtaining a lithium secondary battery with higher cycle performance, d in the formula (I) is preferably more than 0, more preferably 0.001 or more, and still more preferably 0.005 or more. For obtaining a lithium secondary battery with higher discharge capacity at high discharge rate, d in the formula (I) is preferably 0.08 or less, more preferably 0.04 or less, and still more preferably 0.02 or less.

The upper limit values and lower limit values of d can be arbitrarily combined.

M in the formula (I) is preferably Al, Mg or Zr from the viewpoint of obtaining a lithium secondary battery with higher cycle performance, and is preferably Mg or Al and especially preferably Al from the viewpoint of obtaining a lithium secondary battery with higher thermal stability.

(Layered Structure)

Firstly, the crystal structure of the positive electrode active material for a lithium secondary battery of the present embodiment is a layered structure, and is more preferably a hexagonal crystal structure or a monoclinic crystal structure.

The hexagonal crystal structure belongs to any one of the space groups selected from the group consisting of P3, P3$_1$, P3$_2$, R3, P-3, R-3, P312, P321, P3$_1$12, P3$_1$21, P3$_2$12, P3$_2$21, R32, P3 m1, P31m, P3c1, P31c, R3m, R3c, P-31m, P-31c, P-3 m1, P-3c1, R-3m, R-3c, P6, P6$_1$, P6$_5$, P6$_2$, P6$_4$, P6$_3$, P-6, P6/m, P6$_3$/m, P622, P6$_1$22, P6$_5$22, P6$_2$22, P6$_4$22, P6$_3$22, P6mm, P6cc, P6$_3$ cm, P6$_3$mc, P-6m2, P-6c2, P-62m, P-62c, P6/mmm, P6/mcc, P6$_3$/mcm, and P6$_3$/mmc.

The monoclinic crystal structure belongs to any one of the space groups selected from the group consisting of P2, P2$_1$, C2, Pm, Pc, Cm, Cc, P2/m, P2$_1$/m, C2/m, P2/c, P2$_1$/c, and C2/c.

Among the aforementioned crystal structures, from the viewpoint of obtaining a lithium secondary battery having high discharge capacity, the especially preferable crystal structure of the positive electrode active material is a hexagonal crystal structure belonging to a space group of R-3m or a monoclinic crystal structure belonging to a space group of C2/m.

The space group of the crystal structure of the positive electrode active material for a lithium secondary battery according to the present embodiment can be confirmed as follows.

First, the powder X-ray diffraction measurement is performed with respect to the positive electrode active material for a lithium secondary battery, wherein Cu-Kα is used as a radiation source and the measurement range of a diffraction angle 2θ is set in a range of 10° to 90°, subsequently, Rietveld analysis is performed on the basis of the result (the obtained powder X-ray diffraction pattern), and the crystal structure possessed by the lithium-containing composite metal oxide and the space group in the crystal structure are determined. The Rietveld analysis is a method in which the crystal structure of a material is analyzed using the data of diffraction peaks (diffraction peak intensity and diffraction angle 2θ) in the powder X-ray diffraction measurement of the material, which has been conventionally used (see, for example, "Practice of powder X-ray analysis-Introduction to the Rietveld method" published on Feb. 10, 2002, and edited by Conference for X-ray analysis in The Japan Society for Analytical Chemistry).

(Crystallite Size)

The positive electrode active material for a lithium secondary battery of the present embodiment has a crystallite size α/crystallite size β ratio (α/β) of 1.60 to 2.40, wherein the crystallite size α is within a peak region of 2θ=18.7±1° (hereinafter, also referred to as "peak A") and the crystallite size β is within a peak region of 2θ=44.6±1° (hereinafter, also referred to as "peak B"), each determined by a powder X-ray diffraction measurement using Cu-Kα radiation.

The crystallite size α at the peak A and the crystallite size β at the peak B in the positive electrode active material for a lithium secondary battery of the present embodiment can be confirmed as follows.

First, the powder X-ray diffraction measurement is performed with respect to the positive electrode active material, wherein Cu-Kα is used as a radiation source and the measurement range of a diffraction angle 2θ is set in a range of 10° to 90°, to thereby determine peaks corresponding to the peak A and the peak B. Then, the half width values of the determined peaks are calculated, from which the crystal sizes are calculated by Scherrer equation: $D=K\lambda/B \cos\theta$ (D: crystallite size, K: Scherrer constant, B: peak half width value). The determination of crystallite size by the aforementioned formula is a technique that has been conventionally used for this purpose (see, for example, "X-ray structural analysis—determination of arrangement of atoms—", third edition issued Apr. 30, 2002, Yoshio Waseda, Eiichiro Matsubara). Hereinbelow, the determination of the crystal size is more specifically explained referring to the drawings, taking as an example the case where the positive electrode active material for a lithium secondary battery has a hexagonal crystal structure belonging to a space group of R-3m.

Figure 2A:
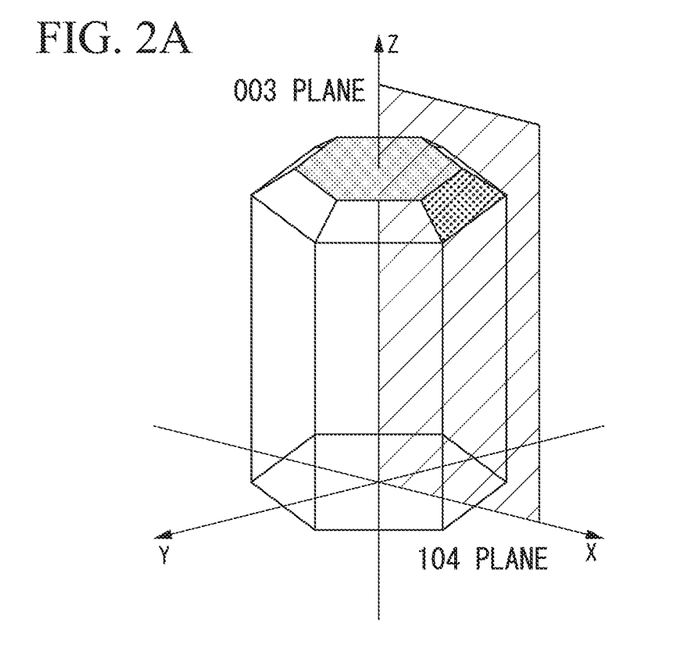
FIG. 2A is a schematic view for explaining the crystallite size in the present invention, which schematically shows the 003 plane and the 104 plane in the crystallite.

In FIG. 2A, the 003 plane and the 104 plane in the crystallites are schematically shown. In FIG. 2A, the crystallite size in a direction perpendicular to the 003 plane corresponds to the crystallite size α, and the crystallite size in a direction perpendicular to the 104 plane corresponds to the crystallite size β.

Figure 2B:
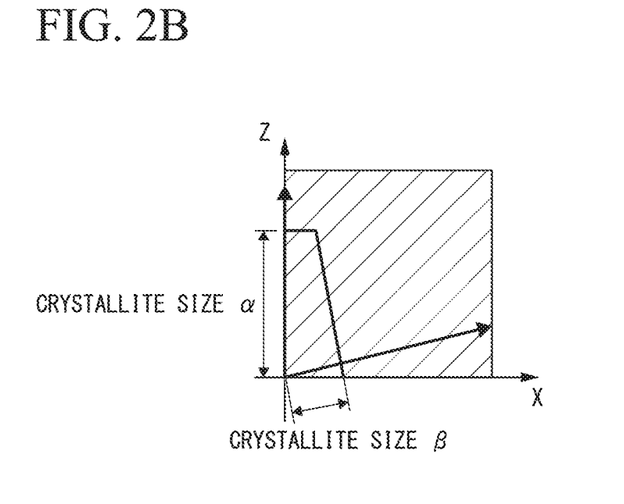
FIG. 2B is a schematic view for explaining the crystallite size in the present invention, which schematically shows the relationship between the crystallite size α that can be calculated from a peak A described later, and the crystallite size β that can be calculated from a peak B described later.

FIG. 2B is a schematic view showing the relationship between the crystallite size α that can be calculated from the peak A, and the crystallite size β that can be calculated from the peak B.

The larger value exceeding 1 of the crystallite size ratio α/β indicates the anisotropic growth of crystallite parallel to the z axis in FIG. 2A, and the value of α/β closer to 1 indicates the isotropic growth of crystallite.

In the positive electrode active material for a lithium secondary battery of the present embodiment, the value of α/β is 1.60 to 2.40. Therefore, the crystallites in the positive electrode material have been anisotropically grown along the z-axis direction, relative to the x-axis or y-axis shown in FIG. 2A. In other words, the formation of crystal layers has advanced in a direction parallel to the z axis. The present inventors have found that the anisotropically grown crystallites as a positive electrode active material for a lithium secondary battery can improve the battery performance such as discharge capacity more than the isotropically grown crystallites. The reason for this is presumed to be as follows. In the case of crystallites anisotropically grown in a direction parallel to the z axis, the distance to the center of each crystallite is shorter than the case of crystallites anisotropically grown flatly (for example, crystallites anisotropically grown in a direction parallel to the y axis shown in FIG. 2A), so that the migration of Li caused by charging and discharging is easier in the case of the crystallites anisotropically grown in a direction parallel to the z axis.

In the present embodiment, for obtaining a lithium secondary battery with higher discharge capacity, the value of α/β is preferably more than 1.60, more preferably 1.70 or more, and still more preferably 1.75 or more. Further, the value of α/β is preferably less than 2.40, more preferably 2.20 or less, and especially preferably 2.10 or less. The upper limit values and lower limit values of α/β can be arbitrarily combined.

For obtaining a lithium secondary battery with higher cycle performance, the crystallite size α is preferably 400 Å or more to 1,200 Å or less, more preferably 1,100 Å or less, still more preferably 1,000 Å or less, still more preferably 900 Å or less, and especially preferably 840 Å or less. For obtaining a lithium secondary battery with higher charge capacity, the crystallite size α is preferably 450 Å or more, and more preferably 500 Å or more.

The upper limit values and lower limit values of α can be arbitrarily combined.

For obtaining a lithium secondary battery with higher cycle performance, the crystallite size β is preferably 600 Å or less, more preferably 550 Å or less, still more preferably 500 Å or less, and especially preferably 450 Å or less. For obtaining a lithium secondary battery with higher charge capacity, the crystallite size β is preferably 200 Å or more, more preferably 250 Å or more, and still more preferably 300 Å or more.

The upper limit values and lower limit values of β can be arbitrarily combined.

(Particle Diameter)

As to the form of particles of the positive electrode active material for a lithium secondary battery of the present embodiment, the positive electrode active material is in the form of secondary particles formed by aggregation of primary particles. In the present embodiment, for enhancing the effects of the present invention, the average primary particle diameter is preferably 0.1 µm or more to 2.0 µm or less, more preferably 0.1 µm or more to 1.5 µm or less, and still more preferably 0.1 µm or more to 1.2 µm or less. The average primary particle diameter can be measured by the SEM observation.

The average secondary particle diameter of the secondary particles formed by aggregation of primary particles is preferably 6 µm or more to 20 µm or less. For enhancing the effects of the present invention, the average secondary particle diameter is more preferably 8 µm or more to 17 µm or less, and still more preferably 10 µm or more to 16 µm or less.

In the present embodiment, the "average secondary particle diameter" of the positive electrode active material for a lithium secondary battery indicates a value measured by the following method (laser diffraction scattering method).

First, 0.1 g of a powder of the positive electrode active material for a lithium secondary battery is added to 50 ml of 0.2 wt % aqueous solution of sodium hexametaphosphate, thereby obtaining dispersion with the powder dispersed therein. The obtained dispersion is subjected to a particle size distribution measurement using a laser diffraction particle size distribution analyzer (LA950, manufactured by HORIBA, Ltd.), whereby the volume-based cumulative particle size distribution is measured. From the obtained cumulative particle size distribution curve, the particle diameter ($D_{50}$) at a 50% cumulation measured from the smaller particle side is determined as the average secondary particle diameter of the positive electrode active material for a lithium secondary battery. Similarly, the particle diameter ($D_{10}$) at a 10% cumulation measured from the smaller particle side is determined as the 10% cumulative diameter, and the particle diameter ($D_{90}$) at a 90% cumulation measured from the smaller particle side is determined as the 90% cumulative diameter.

(10% Cumulative Diameter)

In the present embodiment, for improving the handling of the positive electrode active material for a lithium secondary battery of the present embodiment, the 10% cumulative diameter ($D_{10}$) of the positive electrode active material is preferably 4.0 µm or more, more preferably 5.0 µm or more, and especially preferably 6.0 µm or more.

For obtaining a lithium secondary battery with higher discharge capacity at high discharge rate, the 10% cumulative diameter ($D_{10}$) of the positive electrode active material is preferably 10.0 µm or less, more preferably 9.0 µm or less, and especially preferably 8.0 µm or less.

The upper limit values and lower limit values of the 10% cumulative diameter ($D_{10}$) can be arbitrarily combined.
(BET Specific Surface Area)

The BET specific surface area of the positive electrode active material for a lithium secondary battery of the present embodiment is in a range of 0.1 m²/g or more to 1.0 m²/g or less.

The BET specific surface area is preferably 0.12 m²/g or more to 0.8 m²/g or less, and still more preferably 0.15 m²/g or more to 0.6 m²/g or less.

With the BET specific surface area of not less than the above lower limit value, a lithium secondary battery with higher discharge capacity at high discharge rate can be obtained. The BET specific surface area of not more than the above upper limit value can improve the handling of the positive electrode active material for a lithium secondary battery.
(Tapped Bulk Density)

In the present embodiment, for obtaining a lithium secondary battery with higher electrode density, the tapped bulk density of the positive electrode active material for a lithium secondary battery is preferably 2.0 g/mL or more, more preferably 2.2 g/mL or more, and still more preferably 2.3 g/mL or more. Further, for obtaining an electrode with improved impregnation with an electrolytic liquid, the tapped bulk density is preferably 3.5 g/mL or less, more preferably 3.2 g/mL or less, and still more preferably 3.0 g/mL or less.

The tapped bulk density can be measured in accordance with JIS R 1628-1997.

In the present specification, the "tapped density" is the tapped bulk density measured in accordance with JIS R 1628-1997.
(Product of 10% Cumulative Diameter and Tapped Density)

In the present embodiment, for enhancing the effects of the present invention, it is preferable that a product of the 10% cumulative diameter ($D_{10}$) and the tapped density of the positive electrode active material is 17 to 25 g·µm/mL, wherein the 10% cumulative diameter is obtained from the results of the particle size distribution measurement.

As a result of the studies made by the present inventors, it has been found that a positive electrode active material with the product of a 10% cumulative diameter ($D_{10}$) and a tapped density being within the aforementioned range enables a lithium secondary battery to exhibit higher discharge capacity than conventional lithium secondary batteries.

For further improving the discharge capacity, the product of a 10% cumulative diameter ($D_{10}$) and a tapped density is preferably 18 g·µm/mL or more, and more preferably 18.8 g·µm/mL or more. Further, the product is preferably 22 g·µm/mL or less, and more preferably 20 g·µm/mL or less.

The upper limit values and lower limit values of the product of the 10% cumulative diameter ($D_{10}$) and the tapped density can be arbitrarily combined.
(Integrated Diffraction Peak Intensity Ratio)

When the positive electrode active material for a lithium secondary battery according to the present embodiment has a powder X-ray diffraction (XRD) pattern ascribed to a space group of R-3m, for improving the effects of the present invention, the integrated intensity ratio of the (003) peak to the (104) peak in the XRD pattern is preferably 1 or more to 1.5 or less, more preferably 1.1 or more to 1.4 or less, and still more preferably 1.15 or more to 1.3 or less.

Further, the positive electrode active material for a lithium secondary battery of the present embodiment may be mixed with other active materials as long as the effects of the present embodiment are not impaired.

[Method for Producing Positive Electrode Active Material for Lithium Secondary Battery]

In the present embodiment, for producing the positive electrode active material for a lithium secondary battery, it is preferred to first prepare a metal composite compound containing metals other than lithium, i.e., Ni and Co, and at least one optional metal selected from the group consisting of Mg, Al, Ca, Sc, Ti, V, Cr, Mn, Fe, Cu, Zn, Ga, Ge, Sr, Y, Zr, Nb, Mo, Tc, Ru, Rh, Pd, Ag, Cd, In and Sn, and then calcine the metal composite compound with a suitable lithium salt. As the metal composite compound, it is preferable to use a metal composite hydroxide or a metal composite oxide. Hereinbelow, as to one example of the method for producing the lithium-containing composite metal oxide, explanations are made separately on the step of producing the metal composite compound and the step of producing the lithium-containing composite metal oxide.
(Step of Producing Metal Composite Compound)

The metal composite compound can be produced by the conventionally known batch method or co-precipitation method. Hereinbelow, the method for producing the metal composite compound is explained taking as an example the case of production of a metal composite hydroxide containing nickel, cobalt and manganese as metals.

First, a nickel salt solution, a cobalt salt solution, a manganese salt solution and a complexing agent are reacted by the co-precipitation method, especially, a continuous method described in Japanese Patent Unexamined Publication No. 2002-201028 to produce a metal composite hydroxide represented by $Ni_xCo_yMn_z(OH)_2$, wherein x+y+z=1.

There is no particular limitation with respect to a nickel salt as a solute in the aforementioned nickel salt solution. For example, any of nickel sulfate, nickel nitrate, nickel chloride and nickel acetate can be used. As a cobalt salt as a solute in the cobalt salt solution, for example, any of cobalt sulfate, cobalt nitrate and cobalt chloride can be used. As a manganese salt as a solute in the manganese salt solution, for example, any of manganese sulfate, manganese nitrate and manganese chloride can be used. These metal salts are used in a ratio corresponding to the composition ratio of the aforementioned $Ni_xCo_yMn_z(OH)_2$. As a solvent, water can be used.

The complexing agent is a substance capable of forming a complex with ions of nickel, cobalt and manganese in an aqueous solution, the examples of which include an ammonium ion donor (ammonium sulfate, ammonium chloride, ammonium carbonate, ammonium fluoride, etc.), hydrazine, ethylenediaminetetraacetic acid, nitrilotriacetic acid, uracil diacetate and glycine.

For adjusting the pH value of the aqueous solution during the precipitation, if necessary, an alkali metal hydroxide (such as sodium hydroxide or potassium hydroxide) may be added.

Successive addition of the aforementioned nickel salt solution, cobalt salt solution and manganese salt solution as well as the complexing agent to a reaction vessel allows nickel, cobalt and manganese to react with each other, resulting in the generation of $Ni_xCo_yMn_z(OH)_2$. The reaction is performed with the temperature in the reaction vessel being regulated, for example, within the range of 10° C. or more to 60° C. or less, preferably 20° C. or more to 60° C. or less and the pH value in the reaction vessel being regulated, for example, within the range of 9 or more to 13 or less, preferably 10 or more to 13 or less, while appropriately agitating the content of the reaction vessel. The reaction can be carried out in either a batchwise manner or a continuous manner. For example, the reaction can be carried out in a continuous manner using a reaction vessel equipped with an overflow pipe as described in Japanese Unexamined Patent Application, First Publication No. Hei 2-6340.

After the reaction as described above, the resulting precipitate of the reaction product is washed with water and, then, dried, followed by isolation of a nickel-cobalt-manganese composite hydroxide as the nickel-cobalt-manganese composite compound. If necessary, the resulting may be washed with weak acid water. In the above example, a nickel-cobalt-manganese composite hydroxide is produced; however, a nickel-cobalt-manganese composite oxide may be produced instead.

With respect to various properties of the positive electrode active material (for a lithium secondary battery) to be finally obtained as a result of carrying out the process as described below, i.e., primary particle diameter, secondary particle diameter, and BET specific surface area, such properties can be controlled by appropriately adjusting the concentrations of the metal salts to be supplied to the reaction vessel, agitation speed, reaction temperature, reaction pH, and calcination conditions described below, and the like. Especially for controlling a value obtained by dividing the tapped density by the untapped density to fall within a preferred range, for example, it is preferable to adjust the conditions such that the metal composite hydroxide is to have a morphology of spherical secondary particles. Here, the "untapped density" corresponds to the initial bulk density in JIS R 1628:1997. Further, for realizing a more desirable particle morphology, a bubbling with various gases such as inert gases (e.g., nitrogen, argon and carbon dioxide), air and oxygen may be carried out as well in addition to the adjustment of the aforementioned conditions. The reaction conditions can be optimized while monitoring the various physical properties of the final positive active material for a lithium secondary battery to be obtained, because the optimal reaction conditions may vary depending on the size of the reaction vessel used, etc.
(Step of Producing Lithium-containing Composite Metal Oxide)

After drying the metal composite oxide or the metal composite hydroxide, the dried product is mixed with a lithium salt.

The drying conditions are not particularly limited, and may be, for example, any of the following conditions: conditions under which the metal composite oxide or the metal composite hydroxide is not oxidized nor reduced (oxides→oxides, hydroxides→hydroxide), conditions under which the metal composite hydroxide is oxidized (hydroxide→oxide), and conditions under which the metal composite oxide is reduced (oxides→hydroxide). For providing conditions which do not cause oxidation nor reduction, an inert gas such as nitrogen or a noble gas (e.g., helium and argon) may be used. For providing conditions which oxidize the metal composite hydroxide, the drying may be carried out in an atmosphere of oxygen or air. Further, for providing conditions which reduce the metal composite oxide, a reducing agent such as hydrazine or sodium sulfite may be used in an inert gas atmosphere. As the lithium salt, any of lithium carbonate, lithium nitrate, lithium acetate, lithium hydroxide, lithium hydroxide hydrate and lithium oxide may be used individually or in the form of a mixture of two or more of these lithium salts.

After drying the metal composite oxide or the metal composite hydroxide, the resulting may be subjected to appropriate classification. The aforementioned lithium salt and the metal composite hydroxide are used in respective amounts determined in view of the composition ratio of the end product. For example, when using a nickel-cobalt-manganese composite hydroxide, the lithium salt and the metal composite hydroxide are used in a ratio corresponding to the composition ratio of $LiNi_xCo_yMn_zO_2$ (wherein, x+y+z=1). By calcining a mixture of the nickel-cobalt-manganese composite hydroxide and the lithium salts, a lithium-nickel-cobalt-manganese composite oxide can be obtained. That is, a lithium-containing composite metal oxide can be obtained. The calcination may be carried out in dried air, an oxygen atmosphere, an inert atmosphere or the like depending on the desired composition, and may include a plurality of heating steps if necessary.

The mixing may be carried out in either of a dry mixing manner or a wet mixing manner; however, the dry mixing is preferable for its convenience. Examples of the usable mixers include stirring mixers, V-type mixers, W-type mixers, ribbon mixers, drum mixers and ball mills. The conditions for mixing are preferably set such that the aggregated particles are not broken.

The temperature for calcination of the aforementioned metal composite oxide or metal composite hydroxide and lithium compounds such as lithium hydroxide or lithium carbonate is not particularly limited, but is preferably 650° C. or more to 850° C. or less, and more preferably 700° C. or more to 850° C. or less. The calcination temperature below 650° C. is likely to cause a drawback that an energy density (discharge capacity) and a high rate discharge performance decrease. This may be attributable to a structural factor disturbing the movement of Li, which is inherently caused by the calcination at a temperature below the temperature region.

On the other hand, the calcination temperature exceeding 850° C. is likely to cause problems related to production process such as difficulty in obtaining a lithium-containing composite metal oxide having a desired composition due to volatilization of Li and a problem of deterioration of the battery performance due to increased density of the particles. This is due to the fact that a temperature above 850° C. accelerates a primary particle growth, resulting in the formation of excessively large crystal particles of the lithium-containing composite metal oxide. In addition, another cause of the problem is presumed to reside in that the quantity of Li loss locally increases to cause the structural instability. Furthermore, as the temperature increases, an elemental substitution between sites occupied by a Li element and sites occupied by transition metal elements occurs excessively. This results in the decrease of discharge capacity due to inhibition of Li conduction path. With the calcination temperature being in a range of 700° C. or more to 850° C. or less, a battery having a particularly high energy density (discharge capacity) and an improved charge/discharge cycle performance can be manufactured. The calcination time is preferably 3 hours to 20 hours. The calcination time exceeding 20 hours tends to result in substantially lower battery performance due to volatilization of Li.

The calcination time less than 3 hours tends to result in a poor crystal growth and an inferior battery performance. It is also effective to perform a precalcination in advance of the aforementioned calcination. Such a precalcination is preferably performed at a temperature in the range of 300 to 750° C. for 1 to 10 hours.

[Positive Electrode Active Material for Lithium Secondary Battery and Lithium Secondary Battery]

Next, a positive electrode for a lithium secondary battery using the aforementioned lithium-containing composite metal oxide as a positive electrode active material, and a lithium secondary battery including the positive electrode will be described while explaining the constitution of the lithium secondary battery.

In one example of the lithium secondary battery of the present embodiment, the lithium secondary battery includes a positive electrode, a negative electrode, a separator interposed between the positive electrode and the negative electrode, and an electrolytic solution disposed between the positive electrode and the negative electrode.

Figure 1A:
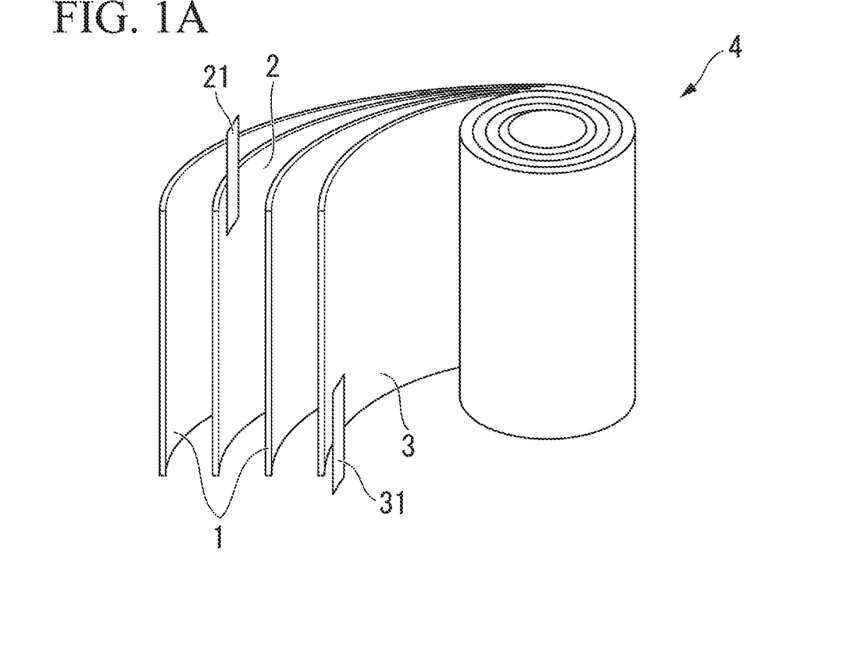
FIG. 1A is a schematic view showing one example of an electrode group to be used in a lithium ion secondary battery.
Figure 1B:
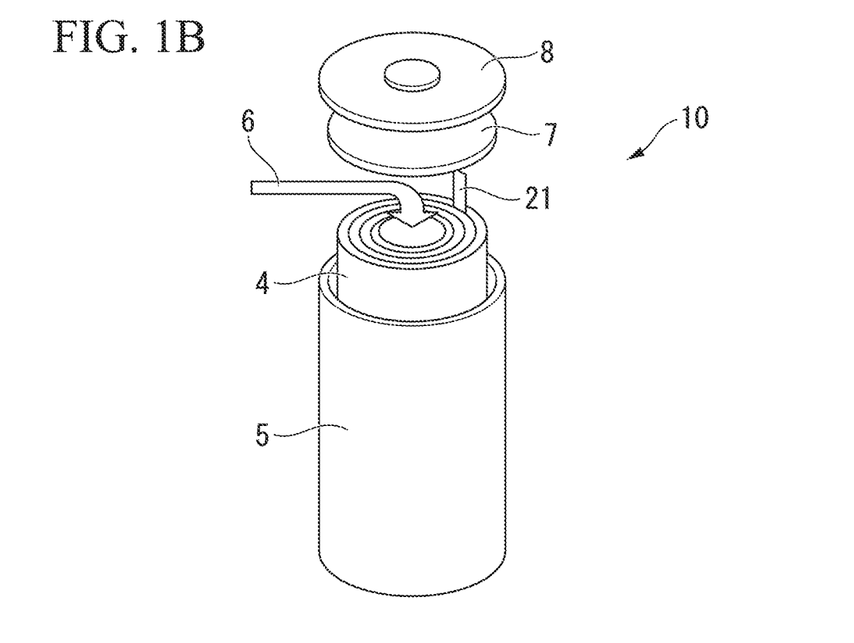
FIG. 1B is a schematic view showing one example of the lithium ion secondary battery using the electrode group shown in FIG. 1A.

FIG. 1A is a schematic view showing one example of an electrode group to be used in a lithium ion secondary battery, and FIG. 1B is a schematic view showing one example of the lithium secondary battery using the electrode group shown in FIG. 1A. A cylindrical lithium secondary battery 10 of the present embodiment is manufactured as described below.

First, as illustrated in FIG. 1A, a pair of separators 1 having a strip shape, a strip-shaped positive electrode 2 having a positive electrode lead 21 at one end, and a strip-shaped negative electrode 3 having a negative electrode lead 31 at one end are laminated in an order of the separator 1, the positive electrode 2, the separator 1, and the negative electrode 3, and are wound into an electrode group 4.

Next, as illustrated in FIG. 1B, the electrode group 4 and an insulator (not shown) are put in a battery can 5, followed by sealing the bottom of the can, and then an electrolytic solution 6 is impregnated into the electrode group 4 such that an electrolyte is disposed between the positive electrode 2 and the negative electrode 3. Further, the top section of the battery can 5 is sealed using a top insulator 7 and a sealing body 8, whereby the lithium secondary battery 10 can be obtained.

The shape of the electrode group 4 may be, for example, of a columnar shape with its cross-section being round, oval, rectangular, or of a round-cornered rectangular shape, wherein the cross-section is perpendicular to the axis of winding of the electrode group 4.

As the shape of the lithium secondary battery including the aforementioned electrode group 4, it is possible to employ the shapes prescribed by IEC60086 that is the standard of batteries prescribed by the International Electrotechnical Commission (IEC), or JIS C 8500. Examples thereof include a cylindrical shape, an angular shape, etc.

The lithium secondary battery is not limited to the wound construction as described above, and may have a laminated construction obtained by laminating a positive electrode, a separator, a negative electrode, a separator, and so forth. Examples of the laminated lithium secondary battery include the so-called coin-type battery, button-type battery, and paper-type (or sheet-type) battery.

Hereinafter, the respective components will be described.
(Positive Electrode)

The positive electrode for a lithium secondary battery of the present embodiment can be manufactured by, first, preparing a positive electrode mix including the aforementioned positive electrode active material for a lithium secondary battery, a conductive material and a binder, and causing the positive electrode mix to be supported on a positive electrode current collector.
(Conductive Material)

As the conductive material included in the positive electrode for a lithium secondary battery of the present embodiment, a carbonaceous material can be used. Examples of the carbonaceous material include a graphite powder, a carbon black (such as acetylene black) and a fibrous carbonaceous material. Since carbon black is a microparticle and has a large surface area, the addition of only a small amount of the carbon black to the positive electrode mix increases the conductivity within the positive electrode for a lithium secondary battery, and improves the charge and discharge efficiency and the output performance as well; however, too large an amount of carbon black deteriorates the binding strength of the binder exerted not only between the positive electrode mix and the positive electrode current collector but also within the positive electrode mix, resulting in an adverse factor that increases an internal resistance.

The amount of the conductive material in the positive electrode mix is preferably from 5 parts by mass or more to 20 parts by mass or less, relative to 100 parts by mass of the positive electrode active material for a lithium secondary battery. This amount may be decreased when using a fibrous carbonaceous material such as a graphitized carbon fiber or a carbon nanotube as the conductive material.

(Binder)

As the binder included in the positive electrode for a lithium secondary battery of the present embodiment, a thermoplastic resin can be used. Examples of the thermoplastic resin include fluororesins such as polyvinylidene fluoride (hereinafter, in some cases, referred to as PVdF), polytetrafluoroethylene (hereinafter, in some cases, referred to as PTFE), ethylene tetrafluoride-propylene hexafluoride-vinylidene fluoride type copolymers, propylene hexafluoride-vinylidene fluoride type copolymers, and ethylene tetrafluoride-perfluorovinyl ether type copolymers; and polyolefin resins such as polyethylene and polypropylene.

Two or more of these thermoplastic resins may be used in the form of a mixture thereof. When a fluororesin and a polyolefin resin are used as the binder, it is possible to obtain a positive electrode mix capable of strong adhesive force relative to the positive electrode current collector as well as strong biding force within the positive electrode mix in itself by adjusting the ratio of the fluororesin to fall within the range of 1% by mass or more to 10% by mass or less, and the ratio of the polyolefin resin to fall within the range of 0.1% by mass or more to 2% by mass or less, based on the total mass of the positive electrode mix.

(Positive Electrode Current Collector)

As the positive electrode current collector included in the positive electrode for a lithium secondary battery of the present embodiment, it is possible to use a strip-shaped member composed of a metal material such as Al, Ni, or stainless steel as a component material. It is especially preferred to use a current collector which is made of Al and is shaped into a thin film because of its high processability and low cost.

Examples of the method for causing the positive electrode mix to be supported on the positive electrode current collector include a method in which the positive electrode mix is press-formed on the positive electrode current collector. Alternatively, the positive electrode mix may be caused to be supported on the positive electrode current collector by a method including producing a paste from the positive electrode mix using an organic solvent, applying the obtained paste of the positive electrode mix to at least one surface of the positive electrode current collector, drying the paste, and press-bonding the resultant to the current collector.

Examples of the organic solvent that can be used for producing the paste from the positive electrode mix include amine-based solvents such as N,N-dimethylaminopropylamine and diethylene triamine; ether-based solvents such as tetrahydrofuran; ketone-based solvents such as methyl ethyl ketone; ester-based solvents such as methyl acetate; and amide-based solvents such as dimethyl acetamide, and N-methyl-2-pyrrolidone (hereinafter, sometimes also referred to as "NMP").

Examples of the method for applying the paste of the positive electrode mix to the positive electrode current collector include a slit die coating method, a screen coating method, a curtain coating method, a knife coating method, a gravure coating method, and an electrostatic spray method.

Thus, the positive electrode for a lithium secondary battery can be produced by the method as described above.

(Negative Electrode)

The negative electrode included in the lithium secondary battery of the present embodiment is not particularly limited as long as it is capable of doping and de-doping lithium ions at a potential lower than that in the positive electrode, and examples thereof include an electrode including a negative electrode current collector having supported thereon a negative electrode mix including a negative electrode active material, and an electrode constituted solely of a negative electrode active material.

(Negative Electrode Active Material)

Examples of the negative electrode active material included in the negative electrode include materials which are carbonaceous materials, chalcogen compounds (oxides, sulfides, etc.), nitrides, metals or alloys, and allow lithium ions to be doped or de-doped at a potential lower than that of the positive electrode active material for a lithium secondary battery.

Examples of the carbonaceous materials that can be used as the negative electrode active material include graphite such as natural graphite and artificial graphite, cokes, carbon black, pyrolytic carbons, carbon fibers, and organic macromolecular compound-sintered bodies.

Examples of oxides that can be used as the negative electrode active material include oxides of silicon represented by the formula: $SiO_x$ (wherein x is an positive integer) such as $SiO_2$ and SiO; oxides of titanium represented by the formula: TiO (wherein x is an positive integer) such as $TiO_2$ and TiO; oxides of vanadium represented by the formula: $VO_x$ (wherein x is an positive integer) such as $V_2O_5$ and $VO_2$; oxides of iron represented by the formula: $FeO_x$ (wherein x is an positive integer) such as $Fe_3O_4$, $Fe_2O_3$ and FeO; oxides of tin represented by the formula: SnO (wherein x is an positive integer) such as $SnO_2$ and SnO; oxides of tungsten represented by the formula: $WO_x$ (wherein x is an positive integer) such as $WO_3$ and $WO_2$; and metal composite oxides containing lithium and titanium or vanadium such as $Li_4Ti_5O_{12}$ and $LiVO_2$.

Examples of sulfides that can be used as the negative electrode active material include sulfides of titanium represented by the formula: $TiS_x$ (wherein x is an positive integer) such as $Ti_2S_3$, $TiS_2$ and TiS; sulfides of vanadium represented by the formula: $VS_x$ (wherein x is an positive integer) such as $V_3S_4$, $VS_2$, and VS; sulfides of iron represented by the formula: $FeS_x$ (wherein x is an positive integer) such as $Fe_3S_4$, $FeS_2$ and FeS; sulfides of molybdenum represented by the formula: MoSx (wherein x is an positive integer) such as $Mo_2S_3$ and $MoS_2$; sulfides of tin represented by the formula: SnSx (wherein x is an positive integer) such as $SnS_2$ and SnS; sulfides of tungsten represented by the formula: WSx (wherein x is an positive integer) such as $WS_2$; sulfides of antimony represented by the formula: SbSx (wherein x is an positive integer) such as $Sb_2S_3$; and sulfides of selenium represented by the formula: $SeS_x$ (wherein x is an positive integer) such as $Se_5S_3$, $SeS_2$ and SeS.

Examples of nitrides that can be used as the negative electrode active material include lithium-containing nitrides such as $Li_3N$ and $Li_{3-x}A_xN$ (wherein A is one or both of Ni and Co, and 0<x<3).

Each of the aforementioned carbonaceous materials, oxides, sulfides and nitrides may be used alone or in combination. Further, each of the aforementioned carbonaceous materials, oxides, sulfides and nitrides may be crystalline or amorphous.

Examples of metals that can be used as the negative electrode active material include lithium metals, silicon metals, tin metals, etc.

Examples of alloys that can be used as the negative electrode active material include lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$.

The metals or alloys are processed into, for example, a foil, and are in many cases used alone as an electrode.

Among the aforementioned negative electrode materials, carbonaceous materials composed mainly of graphite such as natural graphite or artificial graphite are preferably used for the following reasons: the potential of the negative electrode hardly changes during charging from a uncharged state to a fully charged state (the potential flatness is favorable), the average discharge potential is lower, the capacity retention after repeated charge/discharge cycles is higher (the cycle characteristics are favorable), etc. Examples of the shape of the carbonaceous material include a flake shape as in the case of natural graphite, a spherical shape as in the case of mesocarbon microbeads, a fibrous shape as in the case of a graphitized carbon fiber, an agglomerate of fine powder, etc., and the carbonaceous material may have any of these shapes.

The negative electrode mix may include a binder as necessary. As the binder, a thermoplastic resin can be used, and examples thereof include PVdF, thermoplastic polyimides, carboxymethyl cellulose, polyethylene, and polypropylene.

(Negative Electrode Current Collector)

Examples of the negative electrode current collector included in the negative electrode include a strip-shaped member composed of a metal material such as Cu, Ni or stainless steel as a component material. Among these, it is preferred to use a current collector which is made of Cu and is shaped into a thin film, since Cu is unlikely to form an alloy with lithium and can be easily processed.

Examples of the method for causing the negative electrode mix to be supported on the above-described negative electrode current collector include, as in the case of the positive electrode, a press forming method, and a method in which a paste of the negative electrode mix obtained by using a solvent etc., is applied to and dried on the negative electrode current collector, and the resulting is press bonded to the current collector.

(Separator)

As the separator used in the lithium secondary battery of the present embodiment, for example, it is possible to use one that is formed of a material such as a polyolefin resin (e.g., polyethylene or polypropylene), a fluororesin or a nitrogen-containing aromatic polymer, and has a form of a porous film, a nonwoven fabric, a woven fabric or the like. The separator may be composed of two or more of the materials mentioned above, or may be formed by laminating these materials.

Examples of the separator include separators described in Japanese Unexamined Patent Application Publication No. 2000-30686 and Japanese Unexamined Patent Application Publication No. Hei10-324758. In order to increase the volumetric energy density of the battery and to decrease the internal resistance, the thickness of the separator is preferred to be as small as possible, as long as a sufficient mechanical strength can be secured. The thickness is preferably about 5 to 200 μm, more preferably about 5 to 40 μm.

(Electrolytic Solution)

The electrolytic solution used in the lithium secondary battery of the present embodiment contains an electrolyte and an organic solvent.

Examples of the electrolyte contained in the electrolytic solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (wherein "BOB" means bis(oxalato)borate), LiFSI (wherein FSI means bis(fluorosulfonyl)imide), a lithium salt of a lower aliphatic carboxylic acid, and $LiAlCl_4$. Two or more of these salts may be used in the form of a mixture thereof. Among these electrolytes, it is preferred to use at least one fluorine-containing salt selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$.

As the organic solvent included in the electrolyte, it is possible to use, for example, a carbonate such as propylene carbonate, ethylene carbonate, dimethyl carbonate, diethyl carbonate, ethyl methyl carbonate, 4-trifluoromethyl-1,3-dioxolane-2-one, and 1,2-di(methoxycarbonyloxy)ethane; an ether such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyl tetrahydrofuran; an ester such as methyl formate, methyl acetate, and γ-butyrolactone; a nitrile such as acetonitrile and butyronitrile; an amide such as N,N-dimethyl formamide and N,N-dimethylacetoamide; a carbamate such as 3-methyl-2-oxazolidone; a sulfur-containing compound such as sulfolane, dimethyl sulfoxide, and 1,3-propane sultone; or a solvent produced by further introducing a fluoro group into the above-described organic solvent (a solvent in which one or more hydrogen atoms included in the organic solvent is substituted by a fluorine atom).

As the organic solvent, it is preferable to use a mixture of two or more of these organic solvents. Among the aforementioned organic solvents, a solvent mixture including a carbonate is preferable, and a solvent mixture of a cyclic carbonate and a non-cyclic carbonate and a solvent mixture of a cyclic carbonate and ether are more preferable. As the solvent mixture of a cyclic carbonate and a non-cyclic carbonate, a solvent mixture including ethylene carbonate, dimethyl carbonate, and ethyl methyl carbonate is preferable. An electrolytic solution using the aforementioned solvent mixture has many advantages such as a wider operational temperature range, a low tendency of deterioration even after charge/discharge at a high current rate, a low tendency of deterioration even when used for a long period of time, and a low decomposability even when a graphite material such as natural graphite or artificial graphite is used as the active material for the negative electrode.

For improving the stability of the obtained lithium secondary battery, it is preferable to use an electrolytic solution including a lithium salt containing fluorine such as $LiPF_6$ and an organic solvent having a fluorine substituent. A solvent mixture including ether having a fluorine substituent such as pentafluoropropyl methyl ether or 2,2,3,3-tetrafluoropropyl difluoromethyl ether and dimethyl carbonate is more preferable since a high capacity retention is achievable even when the battery is charged and discharged at a high current rate.

A solid electrolyte may be used instead of the aforementioned electrolytic solution. As the solid electrolyte, it is possible to use, for example, an organic polymer electrolyte such as a polyethylene oxide-type polymeric compound or a polymeric compound including at least one type of polymer chain selected from a polyorganosiloxane chain or a polyoxyalkylene chain. It is also possible to use the so-called gel-type electrolyte including a polymer retaining therein a non-aqueous electrolytic solution. Further, it is also possible to use an inorganic solid electrolyte including a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—

GeS$_2$—P$_2$S$_5$. In some cases, the use of such a solid electrolyte may further improve the thermal stability of the lithium secondary battery.

In the lithium secondary battery of the present embodiment, the solid electrolyte, when used, may serve as a separator. In such a case, the separator may be omitted.

The positive electrode active material of the present embodiment having features as described above enables a lithium secondary battery using the positive electrode active material to exhibit higher discharge capacity than the conventional lithium secondary batteries.

The positive electrode for a lithium secondary battery having features as described above has the positive electrode active material of the present embodiment using the aforementioned lithium-containing composite metal oxide, whereby a lithium secondary battery using the positive electrode has higher discharge capacity than the conventional lithium secondary batteries.

Further, the lithium secondary battery having features as described above has the aforementioned positive electrode, and hence has higher discharge capacity than the conventional lithium secondary batteries.

EXAMPLES

Hereinbelow, the present invention will be described in more detail with reference to the Examples.

In the present Examples, evaluations of the produced positive electrode active material for a lithium secondary battery, positive electrode for a lithium secondary battery and lithium secondary battery were implemented as follows.

(1) Evaluation of Positive Electrode Active Material for Lithium Secondary Battery 1. Composition Analysis of Positive Electrode Active Material for Lithium Secondary Battery The composition analysis of the lithium-containing composite metal oxide manufactured by the method described below was carried out using an inductively coupled plasma emission spectrometer (SPS3000, manufactured by SII Nano Technology Inc.) after a sample powder of the lithium-containing composite metal oxide was dissolved in hydrochloric acid.

2. Measurement of Cumulative Particle Size of Positive Electrode Active Material for Lithium Secondary Battery First, 0.1 g of a powder of the lithium-containing composite metal oxide was added to 50 ml of 0.2 wt % aqueous solution of sodium hexametaphosphate, thereby obtaining dispersion with the powder dispersed therein. The obtained dispersion was subjected to a particle size distribution measurement using a laser diffraction particle size distribution analyzer (LA950, manufactured by HORIBA, Ltd.), whereby a volume-based cumulative particle size distribution curve was obtained. From the obtained cumulative particle size distribution curve, the particle sizes at 10% cumulation measured from the smaller particle side was determined as $D_{10}$.

3. Measurement of Crystallite Size of Positive Electrode Active Material for Lithium Secondary Battery The powder X-ray diffraction analysis of the lithium-containing composite metal oxide was carried out using an X-ray diffractometer (X'Pert PRO, manufactured by PANalytical). The obtained lithium-containing composite metal oxide was charged onto a specially designed substrate, and the measurement was carried out using a Cu-K$\alpha$ radiation source with a diffraction angle in the range of $2\theta=10°$ to 90°, thereby obtaining a powder X-ray diffraction pattern. From the X-ray powder diffraction pattern, the half width value of the peak corresponding to the peak A and the half width value of the peak corresponding to the peak B were determined using a comprehensive X-ray powder diffraction pattern analyzing software JADES, from which the crystallite sizes $\alpha$ and $\beta$ were calculated by the Scherrer equation.

4. Measurement of BET Specific Surface Area of Positive Electrode Active Material for Lithium Secondary Battery The BET specific surface area was measured using Macsorb manufactured by Mountech Co., Ltd. after 1 g of the sample powder of lithium-containing composite metal oxide was dried at 150° C. in a nitrogen atmosphere for 15 minutes.

5. Measurement of Tapped Density of Positive Electrode Active Material for Lithium Secondary Battery The tapped density was measured in accordance with JIS R 1628-1997.

(2) Production of Positive Electrode

A lithium-containing composite metal oxide (positive electrode active material) obtained by a production method described below, a conductive material (acetylene black), and a binder (PVdF) were mixed and kneaded so as to obtain a composition including the positive electrode active material, the conductive material, and the binder at a mass ratio of 92:5:3, thereby preparing a paste-form positive electrode mix. In preparation of the positive electrode mix, N-methyl-2-pyrrolidone was used as an organic solvent.

The obtained positive electrode mix was applied to a 40 µm-thick Al foil as a current collector, and was dried in a vacuum at 150° C. for 8 hours, thereby obtaining a positive electrode. The electrode area of the positive electrode was set to 1.65 cm$^2$.

(3) Production of Lithium Secondary Battery (Coin-type Half Cell)

The positive electrode produced in the "(2) Production of Positive Electrode for Lithium Secondary Battery" was placed on a bottom lid of a coin cell for a coin-type battery R2032 (manufactured by Hohsen Corporation) with the aluminum foil surface facing downward, and a laminate film separator (a separator including a heat-resistant porous layer laminated on a polyethylene porous film (thickness: 16 µm)) was placed on the positive electrode. 300 µl of an electrolytic solution was injected thereinto. The electrolytic solution used was prepared by dissolving 1 mol/l of LiPF$_6$ in a liquid mixture of ethylene carbonate (hereinafter, sometimes also referred to as "EC"), dimethyl carbonate (hereinafter, sometimes also referred to as "DMC"), and ethyl methyl carbonate (hereinafter, sometimes also referred to as "EMC") at a volume ratio of 30:35:35. Hereinafter, the electrolytic solution may also be referred to as "LiPF$_6$/EC+DMC+EMC".

Next, metal lithium used as a negative electrode was placed on the laminate film separator, covered with a top lid through a gasket, and swaged using a swage, thereby producing a lithium secondary battery (coin-type battery R2032). Hereinafter, this battery may also be referred to as "coin-type half cell".

(4) Discharge Test

A discharge test was carried out under conditions described below using the coin-type half cell produced in the "(3) Production of Lithium Secondary Battery (Coin-type Half Cell)".

<Discharge Rate Test>

Test temperature: 25° C.

Constant current/constant voltage charging:maximum charge voltage of 4.3V, charge time of 8 hours, and charge current of 0.2CA.

Constant Current Discharging: minimum discharge voltage of 2.5V.

In the present specification, a discharge capacity exceeding 190 mAh/g was judged as excellent discharge capacity.

Example 1-1

1. Production of Positive Electrode Active Material 1 for Lithium Secondary Battery Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution, an aqueous manganese sulfate solution and an aqueous aluminum sulfate solution were mixed together such that the atomic ratio between nickel atoms, cobalt atoms, manganese atoms and aluminum atoms became 90:7:2:1, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 11.2, thereby obtaining nickel-cobalt-manganese-aluminum composite hydroxide particles. The obtained particles were washed with water after filtration, and dried at 100° C., to thereby obtain a nickel-cobalt-manganese-aluminum composite hydroxide 1. The BET specific surface area of the nickel-cobalt-manganese-aluminum composite hydroxide 1 was 11.59 m$^2$/g.

The thus obtained nickel-cobalt-manganese-aluminum composite hydroxide 1 and a lithium hydroxide powder were weighed such that Li/(Ni+Co+Mn+Al)=1.03, followed by mixing. The resulting was calcined in ambient atmosphere at 725° C. for 10 hours, thereby obtaining an intended positive electrode active material 1 for a lithium secondary battery.

2. Evaluation of Positive Electrode Active Material 1 for Lithium Secondary Battery The composition analysis of the obtained positive electrode active material 1 for a lithium secondary battery was performed and the results were applied to the composition formula (I). As a result, it was found that x=0.01, a=0.90, b=0.07, c=0.02, and d=0.01.

The crystallite sizes α and β calculated from peaks A and B of the positive electrode active material 1 for a lithium secondary battery were 895 Å and 502 Å, respectively, and the ratio (α/β) of the crystallite size α to the crystallite size β was 1.78.

The volume-based 10% cumulative particle size $D_{10}$ of the positive electrode active material 1 for a lithium secondary battery was 7.57 μm.

The BET specific surface area of the positive electrode active material 1 for a lithium secondary battery was 0.40 m$^2$/g.

The tapped bulk density of the positive electrode active material 1 was 2.50 g/ml. Further, the product of the 10% cumulative diameter ($D_{10}$) and the tapped density of the positive electrode active material 1 for a lithium secondary battery was 18.9 g·μm/mL.

The Mn/Co ratio of the positive electrode active material 1 for a lithium secondary battery was 0.29.

3. Evaluation of Lithium Secondary Battery

A coin-type half cell was produced using the positive electrode active material 1 for a lithium secondary battery, and an initial charge/discharge test was carried out. The initial discharge capacity was 215 mAh/g.

Example 1-2

1. Production of Positive Electrode Active Material 2 for Lithium Secondary Battery The nickel-cobalt-manganese-aluminum composite hydroxide 1 and a lithium hydroxide powder were weighed such that Li/(Ni+Co+Mn+Al)=1.03, followed by mixing. The resulting was calcined in an oxygen atmosphere at 600° C. for 5 hours, thereby obtaining a preliminary calcined product 1. The preliminary calcined product 1 was calcined in an oxygen atmosphere at 725° C. for 10 hours, thereby obtaining a positive electrode active material 2 for a lithium secondary battery.

2. Evaluation of Positive Electrode Active Material 2 for Lithium Secondary Battery The composition analysis of the obtained positive electrode active material 2 for a lithium secondary battery was performed and the results were applied to the composition formula (I). As a result, it was found that x=0.02, a=0.90, b=0.07, c=0.02, and d=0.01.

The crystallite sizes α and β calculated from peaks A and B of the positive electrode active material 2 for a lithium secondary battery were 694 Å and 405 Å, respectively, and the ratio (α/β) of the crystallite size α to the crystallite size β was 1.71.

The volume-based 10% cumulative particle size $D_{10}$ of the positive electrode active material 2 for a lithium secondary battery was 6.85 μm.

The BET specific surface area of the positive electrode active material 2 for a lithium secondary battery was 0.42 m$^2$/g.

The tapped bulk density of the positive electrode active material 2 was 2.55 g/ml.

Further, the product of the 10% cumulative diameter ($D_{10}$) and the tapped density of the positive electrode active material 2 for a lithium secondary battery was 17.5 g·μm/mL.

The Mn/Co ratio of the positive electrode active material 2 for a lithium secondary battery was 0.29.

3. Evaluation of Lithium Secondary Battery

A coin-type half cell was produced using the positive electrode active material 2 for a lithium secondary battery, and an initial charge/discharge test was carried out. The initial discharge capacity was 204 mAh/g.

Example 1-3

1. Production of Positive Electrode Active Material 3 for Lithium Secondary Battery The nickel-cobalt-manganese-aluminum composite hydroxide 1 and a lithium hydroxide powder were weighed such that Li/(Ni+Co+Mn+Al)=1.03, followed by mixing. The resulting was calcined in an oxygen atmosphere at 600° C. for 5 hours, thereby obtaining a preliminary calcined product 2. The preliminary calcined product 2 was calcined in an oxygen atmosphere at 750° C. for 10 hours, thereby obtaining a positive electrode active material 3 for a lithium secondary battery.

2. Evaluation of Positive Electrode Active Material 3 for Lithium Secondary Battery The composition analysis of the obtained positive electrode active material 3 for a lithium secondary battery was performed and the results were applied to the composition formula (I). As a result, it was found that x=0.02, a=0.90, b=0.07, c=0.02, and d=0.01.

The crystallite sizes α and β calculated from peaks A and B of the positive electrode active material 3 for a lithium secondary battery were 857 Å and 472 Å, respectively, and the ratio (α/β) of the crystallite size α to the crystallite size β was 1.82.

The volume-based 10% cumulative particle size $D_{10}$ of the positive electrode active material 3 for a lithium secondary battery was 7.17 μm.

The BET specific surface area of the positive electrode active material 3 for a lithium secondary battery was 0.44 m²/g.

The tapped bulk density of the positive electrode active material 3 was 2.46 g/ml.

Further, the product of the 10% cumulative diameter ($D_{10}$) and the tamped density of the positive electrode active material 3 for a lithium secondary battery was 17.6 g·μm/mL.

The Mn/Co ratio of the positive electrode active material 3 for a lithium secondary battery was 0.29.

3. Evaluation of Lithium Secondary Battery

A coin-type half cell was produced using the positive electrode active material 3 for a lithium secondary battery, and an initial charge/discharge test was carried out. The initial discharge capacity was 208 mAh/g.

Example 1-4

1. Production of Positive Electrode Active Material 4 for Lithium Secondary Battery A nickel-cobalt-manganese-aluminum composite hydroxide 2 was produced following the same procedure as in Example 1-1 except that the temperature of the solution in the reaction vessel wat set at 55° C., and an aqueous sodium hydroxide solution was dropwise added to the reaction vessel at an appropriate timing such that the pH of the solution in the reaction vessel became 11.6. The BET specific surface area of the nickel-cobalt-manganese-aluminum composite hydroxide 2 was 13.47 m²/g.

The nickel-cobalt-manganese-aluminum composite hydroxide 2 and a lithium hydroxide powder were weighed such that Li/(Ni+Co+Mn+Al)=1.03, followed by mixing. The resulting was calcined in an oxygen atmosphere at 600° C. for 5 hours, thereby obtaining a preliminary calcined product 3. The preliminary calcined product 3 was calcined in an oxygen atmosphere at 750° C. for 10 hours, thereby obtaining a positive electrode active material 4 for a lithium secondary battery.

2. Evaluation of Positive Electrode Active Material 4 for Lithium Secondary Battery The composition analysis of the obtained positive electrode active material 4 for a lithium secondary battery was performed and the results were applied to the composition formula (I). As a result, it was found that x=0.02, a=0.90, b=0.07, c=0.02, and d=0.01.

The crystallite sizes α and β calculated from peaks A and B of the positive electrode active material 4 for a lithium secondary battery were 848 Å and 493 Å, respectively, and the ratio (α/β) of the crystallite size α to the crystallite size β was 1.72.

The volume-based 10% cumulative particle size $D_{10}$ of the positive electrode active material 4 for a lithium secondary battery was 7.10 μm.

The BET specific surface area of the positive electrode active material 4 for a lithium secondary battery was 0.24 m²/g.

The tapped bulk density of the positive electrode active material 4 was 2.74 g/ml.

Further, the product of the 10% cumulative diameter ($D_{10}$) and the tapped density of the positive electrode active material 4 for a lithium secondary battery was 19.5 g·μm/mL.

The Mn/Co ratio of the positive electrode active material 4 for a lithium secondary battery was 0.29.

3. Evaluation of Lithium Secondary Battery

A coin-type half cell was produced using the positive electrode active material 4 for a lithium secondary battery, and an initial charge/discharge test was carried out. The initial discharge capacity was 196 mAh/g.

Comparative Example 1-1

1. Production of Positive Electrode Active Material 5 for Lithium Secondary Battery A nickel-cobalt-manganese-aluminum composite hydroxide 3 was produced following the same procedure as in Example 1-1 except that the temperature of the solution in the reaction vessel wat set at 50° C., and an aqueous sodium hydroxide solution was dropwise added to the reaction vessel at an appropriate timing such that the pH of the solution in the reaction vessel became 11.9. The BET specific surface area of the nickel-cobalt-manganese-aluminum composite hydroxide 3 was 19.23 m²/g.

The thus obtained nickel-cobalt-manganese-aluminum composite hydroxide 3 and a lithium hydroxide powder were weighed such that Li/(Ni+Co+Mn+Al)=1.03, followed by mixing. The resulting was calcined in an oxygen atmosphere at 700° C. for 5 hours, thereby obtaining a preliminary calcined product 4. The preliminary calcined product 4 was calcined in an oxygen atmosphere at 760° C. for 10 hours, thereby obtaining a positive electrode active material 5 for a lithium secondary battery.

2. Evaluation of Positive Electrode Active Material 5 for Lithium Secondary Battery The composition analysis of the obtained positive electrode active material 5 for a lithium secondary battery was performed and the results were applied to the composition formula (I). As a result, it was found that x=0, a=0.90, b=0.07, c=0.02, and d=0.01.

The crystallite sizes α and β calculated from peaks A and B of the positive electrode active material 5 for a lithium secondary battery were 732 Å and 466 Å, respectively, and the ratio (α/β) of the crystallite size α to the crystallite size β was 1.57.

The volume-based 10% cumulative particle size $D_{10}$ of the positive electrode active material 5 for a lithium secondary battery was 7.14 μm.

The BET specific surface area of the positive electrode active material 5 for a lithium secondary battery was 0.34 m²/g.

The tapped bulk density of the positive electrode active material 5 was 2.40 g/ml. Further, the product of the 10% cumulative diameter ($D_{10}$) and the tapped density of the positive electrode active material 5 for a lithium secondary battery was 17.1 g·μm/mL.

The Mn/Co ratio of the positive electrode active material 5 for a lithium secondary battery was 0.29.

3. Evaluation of Lithium Secondary Battery

A coin-type half cell was produced using the positive electrode active material 5 for a lithium secondary battery, and an initial charge/discharge test was carried out. The initial discharge capacity was 179 mAh/g.

Comparative Example 1-2

1. Production of Positive Electrode Active Material 6 for Lithium Secondary Battery The nickel-cobalt-manganese-aluminum composite hydroxide 3 and a lithium hydroxide powder were weighed such that Li/(Ni+Co+Mn+Al)=1.03, followed by mixing. The resulting was calcined in an oxygen atmosphere at 700° C. for 5 hours, thereby obtaining a preliminary calcined product 5. The preliminary calcined product 5 was calcined in oxygen atmosphere at 725° C. for 10 hours, thereby obtaining a positive electrode active material 6 for a lithium secondary battery.

2. Evaluation of Positive Electrode Active Material 6 for Lithium Secondary Battery The composition analysis of the obtained positive electrode active material 6 for a lithium secondary battery was performed and the results were applied to the composition formula (I). As a result, it was found that x=0.01, a=0.90, b=0.07, c=0.02, and d=0.01.

The crystallite sizes α and β calculated from peaks A and B of the positive electrode active material 6 for a lithium secondary battery were 579 Å and 399 Å, respectively, and the ratio (α/β) of the crystallite size α to the crystallite size β was 1.45.

The volume-based 10% cumulative particle size $D_{10}$ of the positive electrode active material 6 for a lithium secondary battery was 6.65 μm.

The BET specific surface area of the positive electrode active material 6 for a lithium secondary battery was 0.28 m²/g.

The tapped bulk density of the positive electrode active material 6 was 2.47 g/ml.

Further, the product of the 10% cumulative diameter ($D_{10}$) and the tapped density of the positive electrode active material 6 for a lithium secondary battery was 16.4 g·μm/mL.

The Mn/Co ratio of the positive electrode active material 6 for a lithium secondary battery was 0.29.

3. Evaluation of Lithium Secondary Battery

A coin-type half cell was produced using the positive electrode active material 6 for a lithium secondary battery, and an initial charge/discharge test was carried out. The initial discharge capacity was 182 mAh/g.

Example 2-1

1. Production of Positive Electrode Active Material 7 for Lithium Secondary Battery Into a reaction vessel equipped with a stirrer and an overflow pipe was charged water, followed by addition of an aqueous sodium hydroxide solution. The temperature of the resulting liquid was maintained at 55° C.

An aqueous nickel sulfate solution, an aqueous cobalt sulfate solution, an aqueous manganese sulfate solution and an aqueous aluminum sulfate solution were mixed together such that the atomic ratio between nickel atoms, cobalt atoms, manganese atoms and aluminum atoms became 90:4:5:1, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 11.6, thereby obtaining nickel-cobalt-manganese-aluminum composite hydroxide particles. The obtained particles were washed with water after filtration, and dried at 100° C., to thereby obtain a nickel-cobalt-manganese-aluminum composite hydroxide 4. The BET specific surface area of the nickel-cobalt-manganese-aluminum composite hydroxide 4 was 14.12 m²/g.

The nickel-cobalt-manganese-aluminum composite hydroxide 4 and a lithium hydroxide powder were weighed such that Li/(Ni+Co+Mn+Al)=1.03, followed by mixing. The resulting was calcined in an oxygen atmosphere at 600° C. for 5 hours, thereby obtaining a preliminary calcined product 6. The preliminary calcined product 6 was calcined in an oxygen atmosphere at 775° C. for 10 hours, thereby obtaining a positive electrode active material 7 for a lithium secondary battery.

2. Evaluation of Positive Electrode Active Material 7 for Lithium Secondary Battery The composition analysis of the obtained positive electrode active material 7 for a lithium secondary battery was performed and the results were applied to the composition formula (I). As a result, it was found that x=0.01, a=0.90, b=0.04, c=0.05, and d=0.01.

The crystallite sizes α and β calculated from peaks A and B of the positive electrode active material 7 for a lithium secondary battery were 789 Å and 479 Å, respectively, and the ratio (α/β) of the crystallite size α to the crystallite size β was 1.65.

The volume-based 10% cumulative particle size $D_{10}$ of the positive electrode active material 7 for a lithium secondary battery was 7.08 μm.

The BET specific surface area of the positive electrode active material 7 for a lithium secondary battery was 0.24 m²/g.

The tapped bulk density of the positive electrode active material 7 was 2.71 g/ml.

Further, the product of the 10% cumulative diameter ($D_{10}$) and the tapped density of the positive electrode active material 7 for a lithium secondary battery was 19.2 g·μm/mL.

The Mn/Co ratio of the positive electrode active material 7 for a lithium secondary battery was 1.25.

3. Evaluation of Lithium Secondary Battery

A coin-type half cell was produced using the positive electrode active material 7 for a lithium secondary battery, and an initial charge/discharge test was carried out. The initial discharge capacity was 192 mAh/g.

Comparative Example 2-1

1. Production of Positive Electrode Active Material 8 for Lithium Secondary Battery A nickel-cobalt-manganese-aluminum composite hydroxide 5 was produced following the same procedure as in Example 2-1 except that the temperature of the solution in the reaction vessel wat set at 50° C., and an aqueous sodium hydroxide solution was dropwise added to the reaction vessel at an appropriate timing such that the pH of the solution in the reaction vessel became 12.0. The BET specific surface area of the nickel-cobalt-manganese-aluminum composite hydroxide 1 was 17.99 m²/g.

The nickel-cobalt-manganese-aluminum composite hydroxide 8 and a lithium hydroxide powder were weighed such that Li/(Ni+Co+Mn+Al)=1.03, followed by mixing. The resulting was calcined in an oxygen atmosphere at 700° C. for 5 hours, thereby obtaining a preliminary calcined product 7. The preliminary calcined product 7 was calcined in an oxygen atmosphere at 750° C. for 10 hours, thereby obtaining a positive electrode active material 8 for a lithium secondary battery.

2. Evaluation of Positive Electrode Active Material 8 for Lithium Secondary Battery The composition analysis of the obtained positive electrode active material 8 for a lithium secondary battery was performed and the results were applied to the composition formula (I). As a result, it was found that x=0.02, a=0.90, b=0.04, c=0.05, and d=0.01.

The crystallite sizes α and β calculated from peaks A and B of the positive electrode active material 8 for a lithium secondary battery were 615 Å and 425 Å, respectively, and the ratio (α/β) of the crystallite size α to the crystallite size β was 1.45.

The volume-based 10% cumulative particle size $D_{10}$ of the positive electrode active material 8 for a lithium secondary battery was 6.72 μm.

The BET specific surface area of the positive electrode active material 8 for a lithium secondary battery was 0.25 $m^2/g$.

The tapped bulk density of the positive electrode active material 8 was 2.56 g/ml.

Further, the product of the 10% cumulative diameter ($D_{10}$) and the tapped density of the positive electrode active material 8 for a lithium secondary battery was 17.2 g·nm/mL.

The Mn/Co ratio of the positive electrode active material 8 for a lithium secondary battery was 1.25.

3. Evaluation of Lithium Secondary Battery

A coin-type half cell was produced using the positive electrode active material 8 for a lithium secondary battery, and an initial charge/discharge test was carried out. The initial discharge capacity was 180 mAh/g.

Example 3-1

1. Production of Positive Electrode Active Material 9 for Lithium Secondary Battery Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous aluminum sulfate solution were mixed together such that the atomic ratio between nickel atoms, cobalt atoms and aluminum atoms became 83:14:3, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.0, thereby obtaining nickel-cobalt-aluminum composite hydroxide particles. The obtained particles were washed with water after filtration, and dried at 100° C., to thereby obtain a nickel-cobalt-aluminum composite hydroxide 1.

The thus obtained nickel-cobalt-aluminum composite hydroxide 1 and a lithium hydroxide powder were weighed such that Li/(Ni+Co+Al)=1.03, followed by mixing. The resulting was calcined in ambient atmosphere at 750° C. for 5 hours, thereby obtaining an intended positive electrode active material 9 for a lithium secondary battery.

2. Evaluation of Positive Electrode Active Material 9 for Lithium Secondary Battery The composition analysis of the obtained positive electrode active material 9 for a lithium secondary battery was performed and the results were applied to the composition formula (I). As a result, it was found that x=0, a=0.83, b=0.14, c=0.00, and d=0.03.

The crystallite sizes α and β calculated from peaks A and B of the positive electrode active material 9 for a lithium secondary battery were 1,032 Å and 537 Å, respectively, and the ratio (α/β) of the crystallite size α to the crystallite size β was 1.92.

The volume-based 10% cumulative particle size $D_{10}$ of the positive electrode active material 9 for a lithium secondary battery was 7.18 μm.

The BET specific surface area of the positive electrode active material 9 for a lithium secondary battery was 0.20 $m^2/g$.

The tapped bulk density of the positive electrode active material 9 was 2.65 g/ml.

Further, the product of the 10% cumulative diameter ($D_{10}$) and the tapped density of the positive electrode active material 9 for a lithium secondary battery was 19.0 g·μm/mL.

The Mn/Co ratio of the positive electrode active material 9 for a lithium secondary battery was 0.00.

3. Evaluation of Lithium Secondary Battery

A coin-type half cell was produced using the positive electrode active material 9 for a lithium secondary battery, and an initial charge/discharge test was carried out. The initial discharge capacity was 191 mAh/g.

The results of the Examples and Comparative Examples are summarized in Table 1.

TABLE 1

| | Crystallite Size | | | Tapped Density | $D_{10}$ | Tapped Density × $D_{10}$ | BET Specific Surface Area | Discharge Capacity | Composition | Ratio in Composition |
|---|---|---|---|---|---|---|---|---|---|---|
| | α[Å] | β[Å] | α/β | [g/ml] | [μm] | [g · μm/ml] | [$m^2$/g] | [mAh/g] | Mn/Co | Formula (I) |
| Ex. 1-1 | 895 | 502 | 1.78 | 2.50 | 7.57 | 18.9 | 0.40 | 215 | 0.29 | Ni/Co/Mn/Al = 90/7/2/1 |
| Ex. 1-2 | 694 | 405 | 1.71 | 2.55 | 6.85 | 17.5 | 0.42 | 204 | 0.29 | Ni/Co/Mn/Al = 90/7/2/1 |
| Ex. 1-3 | 857 | 472 | 1.82 | 2.46 | 7.17 | 17.6 | 0.44 | 208 | 0.29 | Ni/Co/Mn/Al = 90/7/2/1 |
| Ex. 1-4 | 848 | 493 | 1.72 | 2.74 | 7.10 | 19.5 | 0.24 | 196 | 0.29 | Ni/Co/Mn/Al = 90/7/2/1 |
| Comp. EX. 1-1 | 732 | 466 | 1.57 | 2.40 | 7.14 | 17.1 | 0.34 | 179 | 0.29 | Ni/Co/Mn/Al = 90/7/2/1 |

TABLE 1-continued

|  | Crystallite Size | | | Tapped Density | $D_{10}$ | Tapped Density × $D_{10}$ | BET Specific Surface Area | Discharge Capacity | Composition | Ratio in Composition |
|---|---|---|---|---|---|---|---|---|---|---|
|  | α[Å] | β[Å] | α/β | [g/ml] | [μm] | [g·μm/ml] | [m²/g] | [mAh/g] | Mn/Co | Formula (I) |
| Comp. EX. 1-2 | 579 | 399 | 1.45 | 2.47 | 6.65 | 16.4 | 0.28 | 182 | 0.29 | Ni/Co/Mn/Al = 90/7/2/1 |
| Ex. 2-1 | 789 | 479 | 1.65 | 2.71 | 7.08 | 19.2 | 0.24 | 192 | 1.25 | Ni/Co/Mn/Al = 90/4/5/1 |
| Comp. EX. 2-1 | 615 | 425 | 1.45 | 2.56 | 6.72 | 17.2 | 0.25 | 180 | 1.25 | Ni/Co/Mn/Al = 90/4/5/1 |
| Ex. 3-1 | 1032 | 537 | 1.92 | 2.65 | 7.18 | 19.0 | 0.20 | 191 | 0 | Ni/Co/Al = 83/14/3 |

The results of the evaluation show that the lithium secondary batteries using the positive electrode active materials of the Examples, where the α/β ratios were in the range of 1.65 to 1.92 and the crystallites had been anisotropically grown, exhibited higher discharge capacity than the lithium secondary batteries using the positive electrode active materials of the Comparative Examples, where the α/β ratios were in the range of 1.45 to 1.57 and the anisotropic growth of crystallites was insufficient.

DESCRIPTION OF THE REFERENCE SIGNS

1 Separator
2 Positive electrode
3 Negative electrode
4 Electrode group
5 Battery can
6 Electrolytic liquid
7 Top insulator
8 Sealing body
10 Lithium secondary battery
21 Positive electrode lead
31 Negative electrode lead

The invention claimed is:

1. A positive electrode active material for a lithium secondary battery, comprising secondary particles that are aggregates of primary particles capable of being doped and undoped with lithium ions,
said positive electrode active material having:
an α-NaFeO$_2$ type crystal structure represented by formula (I) below:

$$Li[Li_x(Ni_aCo_bMn_cM_d)_{1-x}]O_2 \quad (I)$$

wherein 0≤x≤0.1, 0.7<a<1, 0<b<0.2, 0≤c<0.2, 0<d<0.1, a+b+c+d=1, and M is at least one metal element selected from the group consisting of Fe, Cr, Ti, Mg, Al, Zr, Ca, Sc, V, Cr, Cu, Zn, Ga, Ge, Sr, Y, Zr, Nb, Mo, Tc, Ru, Rh, Pd, Ag, Cd, In and Sn; and
a crystallite size α/crystallite size β ratio (α/β) of 1.60 or more to 2.40 or less, wherein the crystallite size α is within a peak region of 2θ=18.7±1° and the crystallite size β is within a peak region of 2θ=44.4±1°, each determined by a powder X-ray diffraction measurement using Cu-Kα radiation, and wherein the crystallite size a is in a range of 400 Å to 900 Å.

2. The positive electrode active material according to claim 1, wherein a product of a 10% cumulative diameter ($D_{10}$) and a tapped density of the positive electrode active material is 17 g·μm/mL or more to 25 g·μm/mL or less.

3. The positive electrode active material according to claim 1, which has a BET specific surface area of 0.1 m²/g or more to 1.0 m²/g or less.

4. The positive electrode active material according to claim 1, wherein an atomic ratio (c/b) of Mn to Co in the formula (I) is 0<c/b<1.3.

5. The positive electrode active material according to claim 1, wherein M is Al.

6. A positive electrode for a lithium secondary battery, comprising the positive electrode active material of claim 1.

7. A lithium secondary battery, comprising the positive electrode of claim 6.

* * * * *